May 8, 1951 C. E. JONES 2,551,886
FRUIT AND VEGETABLE JUICER
Filed March 22, 1948
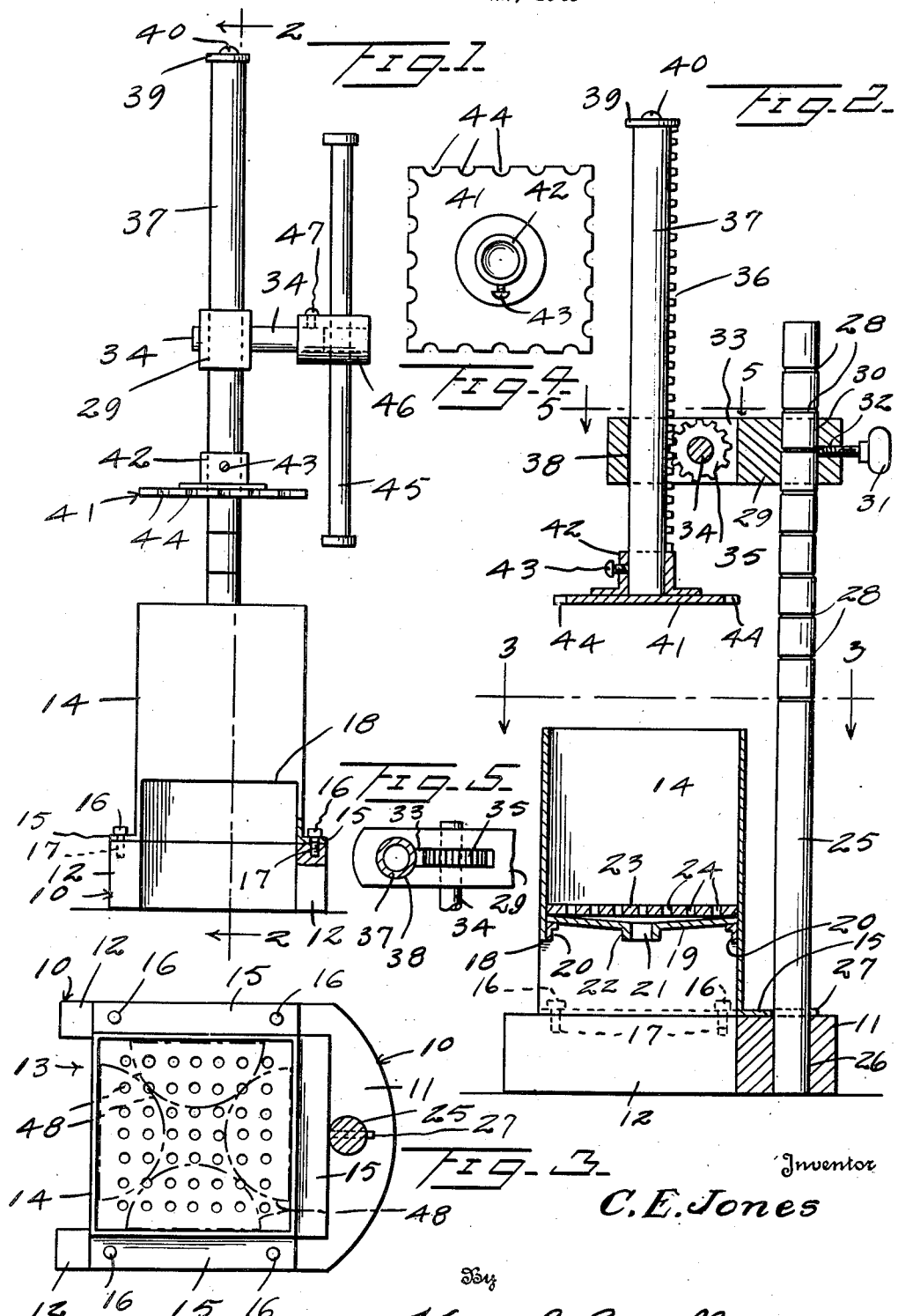
Inventor
C. E. Jones
By
Kimmel & Crowell Attys.

Patented May 8, 1951

2,551,886

UNITED STATES PATENT OFFICE 2,551,886

FRUIT AND VEGETABLE JUICER

Clement E. Jones, Boston, Mass.

Application March 22, 1948, Serial No. 16,301

2 Claims. (Cl. 100—42)

This invention relates to fruit and vegetable juicers and an object thereof is to provide a simple, novel and durable device for compressing and juicing four half sections of fruits or vegetables simultaneously.

Another object of the invention is to provide a juicer of the character stated having a base with a removable container, the base and container being designed to receive a drinking glass or other receptacle in position to receive the juice from the fruits or vegetables which are compressed in the container by means of a plunger head having edge notches to release pressure therebeneath when compressing the fruits or vegetables in the container and the latter having a removable strainer supported on a removable bottom plate having an outlet for the juices to run into the drinking glass or container therebeneath, said parts serving to facilitate cleaning of the juicer to maintain the same in a sanitary condition.

Another object of the invention is to provide a juicer having an upright standard mounted on the base and an arm adjustable on the standard and through which a plunger having a rack bar for engagement by a pinion carried by the arm moves so as to reciprocate the plunger to move into and out of compressing position, the adjustment of the arm serving to accommodate fruits or vegetables of different sizes.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a front elevation of a juicer constructed in accordance with the invention.

Figure 2 is a vertical sectional view taken on the line 2—2 of Figure 1.

Figure 3 is a horizontal sectional view taken on the line 3—3 of Figure 2.

Figure 4 is a plan view of the plunger head.

Figure 5 is a fragmentary detailed section taken on the line 5—5 of Figure 2.

Referring to the drawing, the juicer is shown as comprising a base 10 of suitable material such as metal, wood, plastic or otherwise and of U-shaped form in plan providing a connecting portion 11 at the back and side legs 12 between which the base is open at the front as indicated at 13. The base is adapted to removably support a container 14 shown rectangular in form and having the side and rear walls thereof formed with outturned base flanges 15 provided with apertures to removably receive headed retaining pins 16 extending into sockets 17 in the base, particularly in the side legs 12. The front of the container 14 is open at the bottom, the front wall being severed as indicated at 18 between the legs 12 and the container also being freely open at the top and bottom. The opening 18 permits the insertion of a drinking glass or other receptacle in the front opening between the legs 12 of the base. A bottom wall or plate 19 is supported on suitable ribs or angle members 20 secured to the inner surface of the walls of the container 14 and preferably slopes toward the center where it is provided with an opening 21 extending through a depending spout 22. A perforated or foraminous plate 23 is supported on the plate 19 so as to be spaced from the latter between the margins thereof and is shown provided with a plurality of apertures 24 through which the juices may pass.

Mounted vertically in the base 10 in rear of the container 14 at the connecting portion 11 is an upright standard 25 shown extending into a socket or opening 26 in the base and if desired, provided with a peripheral flange 27 engaging the top of the base to limit the downward displacement of the standard 25, while anchoring it removably but firmly in an upright position. The standard is provided at its upper portion with a plurality of spaced annular grooves 28 and a horizontal bearing arm 29 is engaged on the standard through the medium of a vertical opening 30 therethrough so that a set screw 31 shown as a wing screw threaded in a socket 32 through the back of the bearing arm 29 may be turned into any one of the grooves 28 at its tapered inner end, for holding the arm 29 in vertically adjusted position.

The arm 29 is provided with a vertical slot 33 through which a horizontal shaft 34 has bearing in the arm at opposite sides of the slot and has a pinion 35 fixed to the shaft within the slot to engage or mesh with the teeth of a rack bar 36 of a vertically movable plunger 37 slidable in a vertical opening 38 through the arm 29 in front of and communicating with the slot 33. The opening 38 provides a bearing for the plunger and the top of the plunger is provided with a flanged head or cap 39 held as by means of a screw 40 to limit the downward displacement of the plunger with respect to the pinion. The lower end of the plunger removably carries a plunger head 41 in the form of a plate corresponding in shape to the shape of the container and shown as rectangular or square. The plunger head has a central sleeve 42 extending upwardly and fixed to the lower end of the plunger as by means of a set screw 43 engaged through the sleeve and with the plunger. In addition, the marginal edges of the plate forming the plunger head 41 are provided with a series of recesses or notches 44 shown of semi-circular shape or concaved so that when the plunger head is forced down against the fruits or vegetables held in the container 14, the pressure beneath the plunger head will be released to a certain extent, preventing the formation of a dash-pot or resistance to the movement of the plunger. One end of the shaft 34 is provided with means by which it may be oscillated or rotated as by means of a handle 45 shown as a bar slidably mounted through a sleeve 46 at diametrically opposite openings in the latter outwardly of the adjacent end of the shaft 34, to which the sleeve 46 is fixed in any suitable manner as by means of the set screw 47. By this means, the handle or bar 45 may be shifted in the sleeve 46 to secure a longer lever arm and greater pressure against the fruits or vegetables in the container 14 and by rotating the shaft 34 and pinion 35, the latter is caused to raise or lower the plunger 37 by intermeshing engagement with the teeth of the rack bar 36.

The device is particularly designed with the container 14 and the plunger head 41 rectangular in plan, so that four half sections of fruits or vegetables, indicated in dotted lines at 48 in Figure 3 of the drawing, may be inserted into the container with the flat cut sides thereof against the inner surfaces of the walls of the container so as to be simultaneously compressed to remove the juices therefrom when the handle or bar 45 is operated to force the plunger 37 and its head 41 downwardly into the container against the fruits or vegetables with the necessary pressure to compress and force the juices therefrom for collection in a drinking glass or other receptacle positioned therebeneath at the outlet 21. It will thus be seen that the device is designed to juice more than one piece of fruit or vegetable at a time and that the same may be cut in sections other than halves for such purpose. The parts are capable of economical manufacture, quick assembly and disassembly. The parts subject to contact with the juices of the fruits or vegetables may be readily removed for washing or cleaning so as to prevent corrosion and to maintain the device in a sanitary condition at all times.

I claim:

1. A fruit and vegetable juicer comprising a U-shaped base open at the front, a rectangular container having bottom flanges for removably mounting said container on the base at opposite sides of the front opening and having its front wall cut out at the bottom, a bottom plate removably mounted in the container above said cut-out in the front wall thereof and having a central discharge spout, a perforated plate removably mounted in the container on the bottom plate, a vertical standard removably mounted in the base at the rear connecting portion thereof and having a plurality of spaced peripheral grooves in its upper portion, a horizontal arm having an opening for receiving said standard, a set screw threaded through the arm for engagement with the grooves to adjust the arm vertically, said arm having a vertical slot and a vertical opening communicating with the slot, a vertically movable plunger mounted in the latter opening and having rack teeth on one side thereof, a head mounted on the lower end of the plunger of rectangular form in plan and provided with edge notches, said head adapted to move into and out of the container, a shaft journalled through the arm and slot and bearing a pinion to mesh with the rack teeth of the plunger, and a handle mounted on one end of the shaft for rotating the latter to raise or lower the plunger.

2. A fruit and vegetable juicer comprising a U-shaped base open at the front, a rectangular container removably mounted on said base at the opposite sides of the front opening and having a cutout in the lower portion of the front wall thereof, a bottom plate removably mounted in said container above said cutout in the front wall thereof and formed with a central discharge spout, a perforated plate removably mounted in the container on said bottom plate, a vertical standard mounted in said base at the rear connecting portion thereof and having spaced circumferential grooves formed therein, a horizontal arm carried by said standard and slidable therealong, means extending through said arm and engageable with the grooves in said standard for retaining said arm in selected adjusted position, a plunger slidably carried by said arm, a head mounted on the lower end of said plunger having a rectangular plan form and peripheral notches along the edges thereof, said head being adapted to move into and out of said container, and engaging operating means on said arm and said plunger for moving the latter vertically.

CLEMENT E. JONES.

REFERENCES CITED

The following references are of record in the file of this patent:

UNITED STATES PATENTS

| Number | Name | Date |
| --- | --- | --- |
| D. 105,071 | Hand | June 22, 1937 |
| 226,166 | Fanning | Apr. 6, 1880 |
| 949,234 | Johnson | Feb. 15, 1910 |
| 1,402,713 | Brandstetter | Jan. 3, 1922 |
| 1,958,570 | Flegel | May 15, 1934 |
| 1,968,264 | Rice | July 31, 1934 |
| 2,012,679 | Craigo | Aug. 27, 1935 |
| 2,168,430 | Myers | Aug. 8, 1939 |